Aug. 21, 1951   F. A. KUEPPERS   2,564,785
POWER SUPPLY SYSTEM FOR AIRCRAFT
Filed April 4, 1947

INVENTOR.
Friedrich A. Kueppers
BY
Charles S. Wilson
ATTORNEY.

Patented Aug. 21, 1951

2,564,785

UNITED STATES PATENT OFFICE 2,564,785

POWER SUPPLY SYSTEM FOR AIRCRAFT

Friedrich A. Kueppers, Baltimore, Md., assignor to Republic Aviation Corporation, Farmingdale, N. Y., a corporation of Delaware Application April 4, 1947, Serial No. 739,457

9 Claims. (Cl. 175—294)

1

This invention relates to electrical power supply systems for aircraft and especially military aircraft wherein at least two power sources are provided, to wit, one or more storage batteries and one or more engine driven generators. It has in view the protection of each individual supply component and its associated parts to insure a continuous supply of electrical energy in the event one or more, but not all, of the power sources are destroyed or damaged.

The instant invention contemplates the supply of electrical energy from two or more power supplies to a common bus bar with means interposed between each such supply and the bus whereby the failure of any supply source to deliver its full voltage because of damage or complete destruction will immediately cause its removal from the remainder of the system to prevent damage to the other components or possibly to the aircraft itself.

Figure 1:
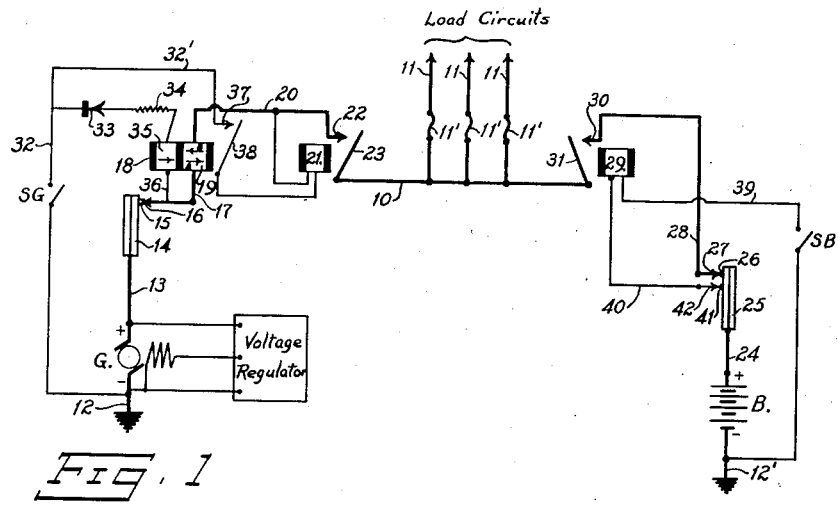
Figure 2:
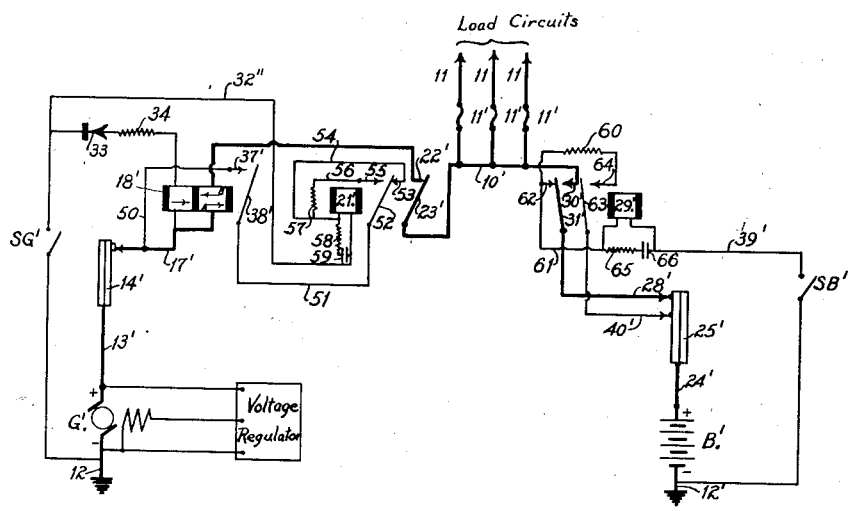

With the above and other objects in view, as will be apparent, the invention consists in the construction, combination and arrangement of parts, all as hereinafter more fully described, claimed and illustrated in the accompanying drawings, wherein:

Fig. 1 is a diagrammatical illustration of the circuit layout and equipment employed by the present invention; and, Fig. 2 is a similar view showing a modification of the invention as shown in Fig. 1 for the purpose of providing additional protection for the system.

The electrical power supply systems of aircraft usually consist of at least one storage battery and at least one engine driven generator. The voltage produced by the generator normally exceeds the battery voltage and supplies the current for the operation of the aircraft as well as sufficient current to maintain the battery at full charge. The battery on the other hand acts as a stabilizer for the generator voltage and provides electrical power for the aircraft if and when the generator or engine fails or is not operating for any reason. With the instant invention, should the battery, for instance, be destroyed or short circuited or damaged to the extent that it fails to supply a predetermined minimum voltage, it is automatically disconnected from the system to prevent an undue or damaging overload on the remaining elements. Likewise should the generator fail or cease operation, it will be automatically disconnected from the system whereupon the remaining elements, which in this case is the battery, will supply the entire load.

Through the foregoing procedure it is apparent that any mishap that may occur to an element or component of the electrical power system will not materially affect or damage the

2 companion elements and cause ultimate failure of the entire electrical system. Further these protective circuits may be applied to power systems wherein a plurality of generators and batteries are employed to disconnect each individual component without affecting normal operation of the remainder of the system.

Referring to Fig. 1 of the drawing, B designates the battery and G the engine driven generator of the electrical system of an aircraft which supply electric power to a common bus bar 10 for distribution to a number of load circuits 11. These load circuits 11 are connected to electrical appliances or loads within the aircraft and are returned through ground to the generator G and/or battery B depending on the load distribution therebetween. In accordance with standard practice each load circuit 11 may include a fuse 11' or other suitable protective device, such as a circuit breaker, to disconnect the load from the supply in the event it becomes short circuited and/or severely overloads the power supply system.

In the normal operation of the system, the generator G and the battery B are connected in parallel between the bus bar 10 and the ground. The main generator circuit consists of the common ground 12 on one side of the generator, the generator with its associated voltage regulator, the lead 13, a bi-metallic or thermostatic switch 14, contacts 15 and 16 associated with the thermostatic switch 14, lead 17, the coil 19 of the relay 18, lead 20, and contacts 22 and 23 of the relay 21 to the bus bar 10. The battery circuit is similarly constructed and arranged with the common ground 12', the battery B, lead 24, a thermostatic switch 25 (like switch 14), contacts 26 and 27 of the thermostatic switch 25, lead 28, and contacts 30 and 31 of the relay 29 to the bus bar 10. It is apparent that with the thermostatic switches 14 and 25 in the normal operating condition as shown and with the contacts 22—23 and 30—31 closed, the generator G and the battery B will supply electric current to the load circuits 11 which are returned to the common grounds 12 and 12'. In actual practice, the generator G is usually designed to deliver a voltage slightly higher than that of the battery B so that the generator will supply the load requirements and in addition cause a small charging current to flow through the battery. As an example, in a 24 volt circuit, the generator G may be arranged with its associated voltage regulator to deliver approximately 28.6 volts and the battery B will deliver approximately 24 volts. Under these circumstances, the generator G, providing a slightly higher voltage than the battery B, will assume the entire load and in addition cause a surplus current to flow through the battery B to the ground 12' and thence back to the generator through the ground 12. Since the battery B is used for supplying the total load when the engine driven generator is damaged or is not operating or functioning properly, and must also provide the power for starting the engine, the battery normally requires constant charging while the plane is in operation.

The system just described, with the exception of the thermostatic switches and relays, constitutes the normal aircraft power supply and is to be modified according to this invention, as will be hereinafter described, to provide maximum automatic protection for both the generator G and the battery B and thereby insure a constant supply of electrical power to the load circuits 11. For this purpose circuits under control of any occupant or occupants of the aircraft are provided whereby either the generator G or battery B or both may be connected into the system as circumstances may require. These circuits are in addition to the main supply circuits previously described.

The control circuit for the generator G comprises a manually operated control or cutout switch SG connected on one side to the ground 12 and on the other side through a lead 32, the rectifier 33, the resistor 34, coil 35 of the relay 18, and lead 36 to the lead 17 of the main supply circuit and thence to the generator G. A second section of the generator control circuit consists of lead 32' connected on one end to lead 32 and on the other end to contact 37, contacts 37 and 38 of the relay 18, the relay 21 and lead 20 of the main circuit. When the pilot or other occupant of the aircraft closes the switch SG while the generator G is in operation, current will flow from the generator through the thermostatic switch 14 and its associated contacts 15 and 16, the coil 35 of the relay 18, the resistor 34, the rectifier 33, and the switch SG to the ground 12. The rectifier 33, by its nature, will permit current to pass only in one direction and therefore cause the coil 35 of the relay 18 to be energized so that the north pole of the magnet will be in the direction of the arrow shown thereon, with the resistor 34 limiting the current through the relay to a predetermined value. Energizing coil 35 will cause the relay contacts 37 and 38 to close completing the circuit through the relay coil 21 and thence through the main circuit to the generator G to energize it and close the contacts 22 and 23. This completes the main circuit from the generator to the bus bar 10. Any current then drawn by the load must pass through the coil 19 of the relay 18 and under normal operating conditions will reinforce the action of the current in coil 35 thereof by energizing the relay in the direction of the arrow A.

The battery control circuit is similar to the generator control circuit but does not include a differential relay such as relay 18 in the generator circuit. This battery control circuit includes a control switch SB, under control of the pilot or other occupant of the aircraft, connected to the ground 12' on one side and the relay 29 on the other, the latter connection being accomplished through lead 39. The return circuit for this relay 29 is through the wire 40, contacts 41 and 42 on the thermostatic switch 25, and lead 24 to the battery B. Closing the switch SB completes the battery circuit through the relay 29, energizing its coil and closing contacts 30 and 31 thereof to connect the battery B through the thermostat 25 to the bus bar 10 and in parallel with the generator G.

With both switches SG and SB closed and the generator G and battery B both connected to the bus bar 10 as above described, an abnormal load or short circuit on the bus bar 10 will bring into play the protective features of the present system. Under these unusual or emergency conditions a very high current will be drawn from both the generator and battery heating the thermostatic switches 14 and 25 whereupon the associated contacts 15 and 16 on the switch 14 and contacts 26—27 and 41—42 on the switch 25 will open. This action will completely de-energize relays 18, 21 and 29, permitting their associated contacts to open and remove both the generator and battery from the bus 10. Upon cooling of the thermostatic switches, power will again be supplied to the load and if the short circuit or abnormal load still exists they will again open and repeat the process until the defect or cause is remedied.

Another advantage of the present system resides in its ability to disconnect a power source should it fall below a predetermined voltage level. Where the battery B is short-circuited or otherwise fails to supply its normal no-load voltage it is disconnected from the bus 10. Since both the battery B and the generator G are in parallel, an abnormally high current will flow from the generator to the battery; and as thermostatic switch 25 is preferably constructed to operate at a lower temperature than the thermostatic switch 14, it will open and disconnect the battery B from the bus 10 before the operation of switch 14 and the generator G will therefore continue uninterruptedly to supply power to the bus. Upon cooling of the thermostatic switch 25, its associated contacts 26—27 and 41—42 will close, but since the battery voltage is below that required to operate relay 29, the contacts 30 and 31 will not close and the battery B will remain disconnected from the bus 10. Where the generator voltage is caused to fall below a predetermined value, current will flow from the battery B to the generator G. Since the winding 19 of the differential relay 18 is in series with the primary or generator circuit this reversal of current will de-energize the coil 19 and re-energize it in the direction of arrow B. This action will cancel the magnetizing effect of coil 35 of relay 18 on the iron core of the relay and permit the contacts 37 and 38 to open. This de-energizes relay 21, whereupon its contacts 22 and 23 will open and remove the generator from the bus 10. Once disconnected from the bus 10, the voltage from the generator is insufficient to energize coil 35 of relay 18 and it will not be returned to the circuit.

With the foregoing system each individual power source is automatically protected against undue overloads caused by defects occurring in any companion source or in the load circuits and in the event of a breakdown in one of the sources of power that source is automatically disconnected from the circuit until necessary repairs or adjustments are made.

In Fig. 2 is disclosed a modification of the system of Fig. 1 wherein provision is made for increased sensitivity to changes in the output voltage of the individual power sources as well as to current variations. Both circuits (Figs. 1 and 2) are similar in arrangement and operation except that the relays 21' and 29' (Fig. 2) are provided with auxiliary control contacts and their associated circuits. For the relay 21', the control voltage circuit consists of wire 50 connected at one end to the wire 17' of the main circuit and at the other to contact 37', contacts 37'—38' of the relay 18', lead 51, auxiliary contacts 52 and 53 of relay 21', wire 54 to the coil of relay 21'. The return circuit for relay 21' includes the lead 32'' and the generator switch SG' to ground. The third auxiliary contact 55 on the relay 21' engages the arm or contact 52 when the relay is energized to complete the alternate relay energizing circuit through wire 56, resistor 57 and a portion of wire 54 to the coil. Bridged across the coil of relay 21' is a series circuit including a resistor 58 and a condenser 59, connected at one end to the lead 54 and at the other end to lead 32''.

The operation of this modified generator control circuit is similar to that of the circuit shown in Fig. 1. The closing of the switch SG' energizes relay 18' to complete the control circuit from the generator G' through the switch 14', lead 50, contacts 37' and 38' of relay 18', auxiliary contacts 52 and 53 of relay 21', relay 21', lead 32'' and switch SG' to ground. This energizes the relay 21' to close contacts 22' and 23' thereof and connect the generator G to the bus bar 10'. However the moment relay 21' is energized, a charge is impressed on condenser 59 which subsequently discharges through the resistor 58 and the coil of relay 21' during the period that the contact 52 progresses from its associated contact 53 to engage contact 55, whereupon the relay is energized at a reduced or holding voltage by reason of the introduction of the resistor 57 in series with the supply voltage. In the case of a 24 volt power supply system, the voltage on relay 21' may be reduced from the normal 24 to 28 volts to approximately 20 volts, this new lower voltage being called the holding voltage for the relay. Since the voltage at which the relay 21' will normally release its contact assembly to assume the non-operative or rest position is approximately 16 volts or 80% of the holding voltage, it is apparent that the generator voltage must also fall to 80% of its normal value, of say 24 volts, before the relay 21' will open its contacts and disconnect the generator G' from the bus bar 10'. As the voltage is then below the value of 24 volts initially required to actuate the relay 21', the generator G' will remain disconnected from the circuit until it is repaired or readjusted. In the circuit shown in Fig. 1, should the relay 21 require 24 volts for actuation, it will not release until the voltage falls below 16 volts. Thus the required change in generator voltage to effect its disconnection from the circuit is approximately 33⅓% of the normal voltage or 8 volts in the case of Fig. 1, whereas a change of approximately 20% or only 5 volts is all that is required to disconnect the generator in the modified circuit of Fig. 2. The foregoing voltage values have been chosen arbitrarily to illustrate the characteristics of the two circuits, it being understood that variations in relays and other components may be made without departing from the scope of this invention.

The battery circuit of Fig. 2 is arranged substantially in accordance with the generator circuit in that a resistor 60 is provided together with additional or auxiliary contacts on relay 29' to provide a reduced holding voltage for the relay 29'. Closing switch SB' completes the battery control circuit from ground through wire 39', lead 61, contacts 62—31' on relay 29', wire 28', thermostat 25' and lead 24' to the battery B'. This energizes relay 29' transferring contact 31' from engagement with contact 62 to engagement with contact 30' and connect the battery to bus bar 10'. Additionally, the contacts 63 and 64 are closed to complete the relay energizing circuit from wire 61 through the resistor 60 and lead 40' to the thermostat 25'. As in the case of the generator circuit, the relay 29' is provided with a resistor 65 and condenser 66 connected in series across the relay to receive a charge at the moment switch SB' is closed and to discharge through the coil of the relay during the transfer of the energizing current from the circuit including contacts 62—31' to the circuit including the resistor 60 and contacts 63—64, which supplies reduced holding voltage for the relay 29' and thereby increases the sensitivity of that relay to subsequent changes in voltages.

Although both of the foregoing circuits have been described in connection with aircraft power supplies employing a single engine driven generator and a single battery it is to be understood that the system may include one or more generators and/or one or more batteries each with their individual protective circuit, and be applied to power supply systems other than for aircraft wherein one or more such sources are connected in parallel to supply a common load.

What is claimed is:

1. An electrical supply system for aircraft having a load circuit grounded on one side to the frame of the aircraft and a plurality of sources of electric power consisting of at least one engine driven generator and at least one battery, said system comprising a ground connection from one side of each source to the frame of the aircraft to thereby connect that side of each source with one side of the load circuit, a conductor connecting the other side of each source to the other side of the load circuit, an overload switch in said conductor, a control relay and rectifier in circuit with and individual to the generator to automatically connect and disconnect it to the load circuit under predetermined electrical conditions, and a control relay in the battery circuit responsive to predetermined battery voltage conditions to effect the connection of the battery with the load circuit.

2. In an electrical power supply system for aircraft, the combination with a plurality of electrical energy sources connected in parallel to supply a common load consisting of at least one voltage controlled engine driven generator and at least one battery, of automatic protective means for the generator comprising a control circuit including an overload switch, a differential control relay, a rectifier and a manually operated switch in series with one side of the generator for each generator, a second relay interconnected with and operable by the differential relay to complete the generator power circuit to the load, and an automatic protective means for the battery comprising a control circuit including an overload switch, a control relay, and a manually operated switch individual to and in series with the battery, said relay being responsive to the battery voltage to complete the battery power circuit to the load.

3. The combination with a power supply system having a plurality of electric energy sources connected in parallel to supply a common load circuit, of control means individual to and associated with each source comprising an overload disconnect switch in series with the source, a control relay in circuit with said source responsive to the voltage thereof to connect it to and disconnect it from the system, and auxiliary means associated with said relay to reduce the voltage applied to the relay upon its response to connect the said source to the system.

4. The combination with a power supply system having a plurality of electric energy sources connected in parallel to supply a common load circuit, of control means individual to and associated with each source comprising an overload disconnect switch in series with said source, a control relay in circuit with and responsive to the voltage of said source to connect it to and disconnect it from the system, a capacitor in series with the relay and the source, and means associated with and controlled by said relay to reduce the voltage applied to the relay upon its response as aforesaid.

5. In an electrical power supply system, consisting of a generator circuit, a battery circuit, and a load circuit, means for connecting said generator circuit to said load circuit, means for connecting said battery circuit to said load circuit, means individual to the generator circuit and to the battery circuit operable simultaneously in response to an overload condition in said load circuit to effect disconnection of said circuits from said load circuit and operable individually in response to overload conditions in their respective circuits to effect disconnection of that circuit from the load circuit, the connecting means aforesaid being operable upon occurrence of a short-circuit condition in said generator circuit or said battery circuit to effect disconnection of said circuits from said load circuit, and means responsive to and operable upon a condition of generator-potential dropping below battery-potential to effect disconnection of said generator circuit from said load circuit, said last means being responsive to and operable upon the condition of the polarity in said generator circuit becoming opposite to the normal operating polarity thereof to effect disconnection of said generator circuit from said load circuit.

6. In an electrical power supply system consisting of a generator circuit, including an electrical generator, a battery circuit, and a load circuit, means for connecting said generator circuit to said load circuit, means for connecting said battery circuit to said load circuit said means being operable to disconnect said circuits upon a short circuit in the battery circuit, means in the generator circuit responsive to an overload condition in said load circuit and in the generator circuit to effect disconnection of said generator circuit from said load circuit, means responsive to an overload condition in said load circuit and in the battery circuit to effect disconnection of said battery circuit from said load circuit, and a current-rectifier and a polarized relay connected in series across the generator, said relay having a potential coil and a current coil, with the potential coil being operable upon a short-circuit in said generator circuit to effect disconnection of this circuit from the load circuit and responsive to the reversal of polarity in said generator circuit to effect disconnection of said generator circuit from said load circuit and the current coil being responsive to a drop of generator potential below battery potential and operable to effect disconnection of said generator circuit from said load circuit.

7. The combination with a power supply system having a plurality of sources of electrical energy connected in parallel to a common load circuit, of control means individual to each source comprising a control relay in series with the source and responsive to the voltage thereof to connect and disconnect the source to and from the system, an automatic overload switch in series with the source and the relay to make and break the circuit including the source and the relay, and an auxiliary control means associated with said relay to reduce the voltage applied to the relay from the source upon its response to connect said source to the system.

8. The combination with a power supply system having a plurality of electrical energy sources consisting of a generator and a battery connected in parallel to a common load circuit, the generator being a source of higher voltage than the battery, of a control means individual to each source comprising a control relay in series with the source and responsive to the voltage thereof to connect and disconnect the source to and from the system, an automatic overload switch in series with the relay and the source to make and break the circuit including the switch, the source and the relay, and an auxiliary means associated with the relay to reduce the voltage applied to the relay upon its operation to connect the source to the system, the overload switch associated with the control means of the battery being responsive to overloads of a lower order than the overload switch associated with the control means of the generator.

9. The combination with a power supply system having a plurality of electrical energy sources consisting of a generator and a battery connected in parallel to a common load circuit, the generator being a source of higher voltage than the battery, of a control means individual to each source comprising a control relay in series with the source and responsive to the voltage thereof to connect and disconnect the source to and from the system, an auxiliary means associated with the relay to reduce the voltage applied to the relay upon its operation to connect the source to the system, and a thermostatic overload switch in series with the relay and the source to make and break the circuit including the switch, the source and the relay, the overload switch associated with the control means of the battery being responsive to a lower temperature than the overload switch associated with the control means of the generator.

FRIEDRICH A. KUEPPERS.

REFERENCES CITED

The following references are of record in the file of this patent:

UNITED STATES PATENTS

| Number | Name | Date |
|---|---|---|
| 742,886 | Maxim | Nov. 3, 1903 |
| 1,114,760 | Heyroth | Oct. 27, 1914 |
| 1,268,438 | Crosby | June 4, 1918 |
| 1,306,315 | Sinclair | June 10, 1919 |
| 1,360,592 | Sloane | Nov. 30, 1920 |
| 1,574,747 | Auth | Mar. 2, 1926 |
| 1,612,063 | Seeger | Dec. 28, 1926 |
| 1,692,216 | Leece | Nov. 20, 1928 |
| 1,875,041 | Leece | Aug. 30, 1932 |
| 1,909,065 | Meyer | May 16, 1933 |
| 2,358,215 | Darling | Sept. 12, 1944 |

OTHER REFERENCES

A. I. E. E. Technical paper 44-38, December 1943, titled "Electric Circuit Fault Protective Principles as Applied to D. C. Aircraft Systems."